(12) United States Patent
Özgünay et al.

(10) Patent No.: US 12,371,249 B2
(45) Date of Patent: Jul. 29, 2025

(54) PACKAGING PRODUCT

(71) Applicant: Conopco Inc., Englewood Cliffs, NJ (US)

(72) Inventors: Atahan Özgünay, Istanbul (TR); Jakub Pedzinski, Heilbronn (DE)

(73) Assignee: Conopco Inc., Englewood Cliffs, NJ (US)

( * ) Notice: Subject to any disclaimer, the term of this patent is extended or adjusted under 35 U.S.C. 154(b) by 877 days.

(21) Appl. No.: 17/296,997

(22) PCT Filed: Dec. 10, 2019

(86) PCT No.: PCT/EP2019/084489
§ 371 (c)(1),
(2) Date: May 26, 2021

(87) PCT Pub. No.: WO2020/120502
PCT Pub. Date: Jun. 18, 2020

(65) Prior Publication Data
US 2022/0033170 A1 Feb. 3, 2022

(30) Foreign Application Priority Data
Dec. 12, 2018 (EP) .................................. 18212071

(51) Int. Cl.
*B65D 85/72* (2006.01)
*B32B 5/14* (2006.01)
*B32B 27/16* (2006.01)
*B32B 27/32* (2006.01)
*B65B 11/52* (2006.01)
*B65D 65/40* (2006.01)

(52) U.S. Cl.
CPC .............. *B65D 85/72* (2013.01); *B32B 5/147* (2013.01); *B32B 27/16* (2013.01); *B32B 27/32* (2013.01); *B65B 11/52* (2013.01); *B65D 65/40* (2013.01); *B32B 2255/10* (2013.01); *B32B 2255/205* (2013.01); *B32B 2307/31* (2013.01); *B32B 2307/7244* (2013.01); *B32B 2307/746* (2013.01); *B32B 2439/70* (2013.01)

(58) Field of Classification Search
CPC ... B32B 15/085; B32B 15/20; B32B 2255/10; B32B 2255/205; B32B 2307/21; B32B 2307/31; B32B 2307/41; B32B 2307/416; B32B 2307/71; B32B 2307/7244; B32B 2307/732; B32B 2307/746; B32B 2439/75; B32B 2439/46; B32B 2439/70; B32B 27/16; B32B 27/18; B32B 27/304; B32B 27/306; B32B 27/32; B32B 5/147; B32B 7/12; B65B 11/52; B65B 25/001; B65B 51/10; B65D 65/40; B65D 85/72
See application file for complete search history.

(56) References Cited

U.S. PATENT DOCUMENTS

| | | |
|---|---|---|
| 4,725,466 A | 2/1988 | Crass et al. |
| 4,883,698 A | 11/1989 | Bothe et al. |
| 4,975,315 A | 12/1990 | Bothe et al. |
| 5,482,771 A | 1/1996 | Shah |
| 6,410,124 B1 | 6/2002 | Peet |
| 6,503,635 B1 | 1/2003 | Kong et al. |
| 7,029,734 B1 | 4/2006 | Wuest et al. |
| 8,859,062 B2 | 10/2014 | Kadowaki et al. |
| 8,877,310 B2 | 11/2014 | Kanai et al. |
| 2003/0186032 A1 | 10/2003 | Rosenberger et al. |
| 2004/0043238 A1 | 3/2004 | Wuest et al. |
| 2008/0286547 A1 | 11/2008 | Hubbard et al. |
| 2009/0098364 A1 | 4/2009 | Honda et al. |
| 2011/0311742 A1 | 12/2011 | Kadowaki et al. |
| 2013/0171389 A1 | 7/2013 | Kanai et al. |
| 2013/0295395 A1 | 11/2013 | Paulino et al. |

FOREIGN PATENT DOCUMENTS

| | | |
|---|---|---|
| EP | 0524572 | 1/1993 |
| IN | 1022/MUM/2001 | 9/2005 |
| WO | WO9832603 | 7/1998 |
| WO | 2019/158231 | 8/2019 |

*Primary Examiner* — Yan Lan
(74) *Attorney, Agent, or Firm* — N.V. Nederlandsch Octrooibureau

(57) ABSTRACT

Disclosed is a dpackaged product comprising a particulate, savoury food material, the packaging comprising a multi-layer packaging film which comprises: an inner layer comprising polypropylene; an outer layer comprising polypropylene; and an intermediate layer comprising polypropylene.

10 Claims, No Drawings

PACKAGING PRODUCT

FIELD OF THE INVENTION

The present invention relates to packaged food products. More particularly to a packaged product comprising a particulate, savoury food material.

BACKGROUND OF THE INVENTION

Packaging for food products is typically made of multi-layer packaging films. Multi-layer packaging films find wide application in packaging a range of products. Lamination of different materials into a single film allows for making use of each individual material's properties at appropriate parts of the final package. For example, a material used in an outer layer could be easily printable, whilst an inner layer can have properties more suitable for contact with the product, such as for example non-stick properties.

EP 0 524 572 A1 (MITSUBISHI CHEMICAL CORP) discloses a stretched, laminated film comprising at least an outer layer, an intermediate layer and an inner layer, said outer layer and inner layer comprising a polypropylenes composition composed of 100 parts by weight of polypropylenes (A), 2 to 30 parts by weight of polybutene and/or polyisobutylene (B) and 0.2 to 5 parts by weight of a polyglycerin fatty acid ester (C), and said intermediate layer comprising polyesters (D).

WO 98/32603 A1 (TETRA LAVAL HOLDINGS AND FINANCE) discloses packaging laminate intended for the production of packaging containers possessing superior release properties vis-a-vis solid or semi-solid food products such as, for example, various types of cheese.

U.S. Pat. No. 6,503,635 discloses a laminated metallized four layer coextruded biaxial oriented film laminated with polyurethane adhesive to a 90 gauge (23 um) biaxially oriented polypropylene (BOPP) film, available from Mobil Chemical Company as 90SPW-L. The order of layers in the metallized film is referred to as A/B/C/ID for the four layers: skin layer A was prepared from a blend of butylene-propylene copolymer with a syndiotactic polypropylene, inner layer B, which was between layer A and C, was prepared from Fina 3371 polypropylene sold by Fina Oil company, layer C, which was between layers B and D was prepared from Chisso 7510 ethylene-propylene-butene terpolymer sold by the Chisso Chemical Company of Japan, outer layer D was prepared from a blend of an ethylene-propylene-butene terpolymer with 5000 ppm methyl methacrylate and propylidene trimethacrylate copolymer spheres and 2400 ppm of SiO2.

U.S. Pat. No. 6,410,124 discloses a three layer film extruded with a base (core) layer B of an isotactic polypropylene homopolymer, sold as Fina 3371, a coextruded skin layer A of a propylene-ethylene-butene-1 terpolymer, sold as Chisso 7510, on one surface of the base layer, and a coextruded layer C of syndiotactic polypropylene, sold as Fina EOD 95-02, on the other surface of the base layer.

The present inventors have recognized that certain challenges present themselves when using conventional multi-layer films for packaging particulate material such as particulate, savoury food materials. In particular the particulate material must be stable to long term storage and thus the multi-layer film must meet stringent oxygen and light exclusion criteria.

In addition, challenges exist in the filling of packaging units with particulate, savoury food materials, for example, the multi-layer films must be able to be processable at high speed to enable reliable filling with the savoury food material without leading to burst packaging or other processing issues.

Furthermore, consumers demand that packaging for particulate savoury materials is recyclable, however, current packaging is poorly recyclable due to the different constituent materials.

There exists a need for a packaging product that meets the industry and consumer processability, storage, and recyclability requirements.

The present inventors have found that by providing a multi-layer film with specific inner, outer and intermediate layers, improved packages for particulate, savoury material can be provided.

SUMMARY OF THE INVENTION

In a first aspect, the present invention is directed to a packaged product comprising a cavity delimited by a wall, wherein the wall comprises a multi-layer packaging film comprising:
   an inner layer comprising polypropylene;
   an outer layer comprising polypropylene; and
   an intermediate layer comprising polypropylene and having an outer face facing the outer layer and an inner face facing the inner layer.
wherein one of the inner and outer faces of the intermediate layer is metallized,
wherein a particulate, savoury food composition is contained within the cavity.

The packaged product of the present application may also be referred to as a packaging product in other words a packaging film that contains a cavity which may contain a savoury product.

Provision of such a packaged product allows for effective manufacture of packaging comprising particulate savoury material with improved properties in terms of the storage stability of the particulate, savoury material. With regards to the manufacture, the multi-layer packaging film is capable of being deployed and/or stored in a configuration (such as a roll) wherein the inner and outer layers are in contact.

Thus in a second aspect the present invention is directed to a process for producing packaged food product(s), comprising the step of:
   i) providing a multi-layer packaging film comprising:
      a. an inner layer comprising polypropylene;
      b. an outer layer comprising polypropylene; and
      c. an intermediate layer comprising polypropylene and having an outer face facing the outer layer and an inner face facing the inner layer,
   ii) forming the multi-layer packaging film into a packaging precursor and filling the packaging precursor with a particulate, savoury material,
   iii) sealing the packaging precursor to provide a packaged food product.

In a further aspect the present invention is directed to a process for producing a multi-layer packaging film for a packaged food product, wherein the process comprises the steps of:
   (i) providing a first packaging sheet material comprising polypropylene;
   (ii) providing a second packaging sheet material comprising polypropylene;
   (iii) providing a third packaging sheet material comprising polypropylene and having an inner and an outer face; and (iv) laminating the first material on the inner face of the third material and the second material on the outer face of the third material

DETAILED DESCRIPTION

The packaged food product according to the present invention comprises a particulate, savoury food material. The packaging comprises a cavity delimited by a wall, wherein the wall comprises a multi-layer packaging film comprising:

an inner layer comprising polypropylene;
an outer layer comprising polypropylene; and
an intermediate layer comprising polypropylene and having an outer face facing the outer layer and an inner face facing the inner layer.

wherein one of the inner and outer faces of the intermediate layer is metallized, wherein the particulate, savoury food composition is contained within the cavity.

As used herein, "inner layer" refers to the layer located closest to the cavity, preferably the inner layer abuts the cavity.

As used herein, "outer layer" refers to the layer located furthest from the cavity.

As used herein "intermediate layer" refers to the layer located between the inner and outer layers, such that one face of the intermediate layer faces the inner layer and the other face of the intermediate layer faces the outer layer.

Preferably, one or more of the inner, outer and intermediate layers comprises an anti-static agent, for example, glyceryl esters of fatty acids, tertiary amines, fatty-acid amides, hydroxyl fatty-acid amides, alkali metal sulfonates, polyether-modified polydiorganosiloxanes, polyalkylphenylsiloxanes, and mixtures thereof. Especially preferred are glyceryl esters of $C_{10}$-$C_{40}$ fatty acids, most preferably the anti-static agent comprises or is glyceryl mono stearate (GMS). In one embodiment the anti-static agent comprises a mixture of glyceryl mono stearate and diethanolamine.

The inner layer preferably comprises the anti-static agent in an amount of from 0.01 to 2% by weight of the layer, more preferably from 0.1 to 1.5% and most preferably from 0.4 to 1.0%.

As packaging films are often stored and deployed onto packaging machines in the form of a roll, migration of the anti-static agent from the inner to the outer layer can often be encountered. To ameliorate this problem the outer layer of the film of the present invention preferably comprises an anti-static agent. Preferably the anti-static agent in the outer layer is substantially the same as the anti-static agent in the inner layer. More preferably the anti-static agent in the outer layer is substantially the same and the amount of anti-static agent in both the inner and outer layers is substantially the same. By "substantially the same is meant that the ratio of the amount (% w/w) of the anti-static agent in the inner layer to the amount (% w/w) of the anti-static agent in the outer layer is in the range 2:1 to 1:2, more preferably 1.5:1 to 1:1.5 and most preferably 1.2:1 to 1:1.2.

The polypropylene of the inner layer is preferably an orientated polypropylene (OPP) as this allows for the inner layer to have good heat-sealing properties.

The inner layer preferably comprises a slip agent to improve reliability during high-speed package manufacture. The slip agent should be of a high molecular weight such that it is non-migratory to the outer layer and also does not interfere with the properties of the anti-static agent. Preferably the slip agent is selected from high molecular weight silicone, poly(methyl methacrylate) and mixtures thereof.

By "high molecular weight" is meant a weight-average molecular weight of at least 100,000 g/mol, more preferably at least 200,000 g mol and most preferably from 500,000 to 5,000,000 g/mol. The PMMA preferably is in the form of particles with a weight-average diameter of from 2 to 16 micron, more preferably 4 to 10 micron.

The inner layer preferably has a thickness of from 10 to 100 microns, more preferably from 20 to 60 microns, even more preferably from 25 to 50 microns, most preferably from 40 to 50 micron.

In a preferred embodiment the packaging film is in the form of a roll, wherein the film is arranged with the inner layer in contact with the outer layer.

The polypropylene of the outer layer is preferably oriented polypropylene (OPP) as this allows for good transparency and printing properties as well as desired heat-sealing properties during packaging manufacture.

The outer layer preferably has a thickness of from 5 to 50 microns, more preferably from 10 to 40 microns and most preferably 20 to 30 microns.

Preferably, the outer layer and/or the inner layer do not comprise polyethylene.

Preferably, the outer layer comprises an oxygen barrier agent. Preferably, the oxygen barrier agent is selected from the group consisting of polyvinyl alcohol (PVOH), ethylene vinyl alcohol, and poly(vinylidene chloride). The outer layer preferably comprises polyvinyl alcohol (PVOH).

The intermediate layer comprises polypropylene. The intermediate layer adds durability and strength to the film. Oriented polypropylene is preferred, more preferred is bi-oriented polypropylene (BOPP).

The intermediate layer is metalized. The metallized intermediate layer provides the packaging product with good storage properties. To improve the barrier properties of the film it is preferred that at least one of the inner and outer faces of the intermediate layer is metallized (for example with a thin coating of aluminium). Preferably one face is metallized and the other is not metallized.

Whilst any suitable corona treatment may be used on the intermediate layer, where one of the faces is metallized it is preferred that said face is chemically corona-treated. On the other hand where a face is not metallized it is preferred that the face is electrically corona-treated.

The thickness of the intermediate layer (including any metallized coating) is preferably from 2 to 30 microns, more preferably 5 to 20 microns and most preferably 8 to 16 microns. Preferably, the intermediate layer does not comprise polyethylene terephthalate.

The outer, intermediate and inner layers comprise polypropylene. Preferably, the outer, intermediate and inner layers do not comprise copolymers or terpolymers that comprise polypropylene.

The intermediate layer preferably has an oxygen transmission rate of less than 0.2 $cm^3/m^2/24$ hr. More preferably the intermediate layer has an oxygen transfer rate of less than 50 $cm^3/m^2/24$ h, more preferably less than 25 $cm^3/m^2/24$ h and most preferably less than 5 $cm^3/m^2/24$ h. The outer layer preferably has an oxygen transfer rate of equal to or less than 80 $cm^3/m^2/24$ h according to ASTM D 3985-17 (23° C., 0% RH).

The multi-layer packaging film preferably has an oxygen transmission rate of less than 0.2, preferably less than 0.1, $cm^3/m^2/24$ hr as measured according to F1927-14 (23° C., 85% RH).

The multi-layer packaging film preferably has an moisture permeability of less than 0.1 $g/m^2/24$ hr. The moisture permeability is determined by American Society for Testing and Materials (ASTM) method F 1249-13 (38° C., 90% RH). More preferably, the intermediate layer preferably has an moisture permeability of less than 0.075 $cm^3/m^2/24$ hr.

Preferably, the intermediate layer is corona-treated. Corona treatment is well known in the art and in conventional lamination processes, the surfaces of the various layer materials are usually corona-treated to allow better adherence during lamination.

The present inventors have found that corona-treatment of the outer layer can provide favourable properties of the final product. Corona-treatment of both faces of the intermediate layer allows for good lamination with the other layers. Therefore in a preferred embodiment the outer and intermediate layers are corona-treated.

Preferably, there will be a first adhesive layer between the intermediate layer and the inner layer and a second adhesive layer between the intermediate layer and the outer layer.

The film may be made by any convenient process but is preferably made by a process comprising the steps of:
(i) providing a first packaging sheet material comprising polypropylene;
(ii) providing a second packaging sheet material comprising polypropylene;
(iii) providing a third packaging sheet material comprising polypropylene and having an inner and an outer face; and
(iv) laminating the first material on the inner face of the third material and the second material on the outer face of the third material.

The first packaging sheet material forms the inner layer, the second the outer layer and the third the intermediate layer.

Lamination can be achieved in step (iv) without corona-treating either of the outer and inner layers. Thus in a preferred embodiment the process does not comprise corona-treating the inner layer and does not comprise corona-treating the outer layer.

The first and second materials are preferably laminated to the third material with adhesive. More preferably the first material is laminated to the third material with solvent-free adhesive and the second material is laminated to the third layer with solvent-based adhesive.

The film of the present invention is preferably used to form a package for particulate, savoury material.

Preferably, the savoury food material is a mixture of dry, savoury food ingredients, preferably wherein the savoury food ingredients are selected from the group consisting of fat, vegetable matter, meat matter, starch and salt.

Preferably, the savoury food material is a dried soup, sauce, stock, gravy or bouillon. Preferably, the particulate, savoury food material has a water content of less than 10 wt. %, by weight of the total food material (excluding the packaging), preferably, less than 8 wt. %, more preferably less than 5 wt. %, even more preferably less than 2.5 wt. %, and most preferably less than 1 wt. %. Preferably, the water content of the particulate, savoury food material is in the range of 0-10 wt. %, by weight of the total food material, preferably in the range of 0.5-8 wt. %, more preferably in the range of 1-5 wt. %.

In another aspect, the present invention relates to a process for producing a packaged food product, comprising the step of:
i) providing a multi-layer packaging film comprising:
a. an inner layer comprising polypropylene;
b. an outer layer comprising polypropylene; and
c. an intermediate layer comprising polypropylene and having an outer face facing the outer layer and an inner face facing the inner layer,
ii) forming the multi-layer packaging film into a packaging precursor and filling the packaging precursor with a particulate, savoury material,
iii) sealing the packaging precursor to provide a packaged food product.

Preferably, the packaging precursor defines an (open) cavity into which the particulate, savoury material is filled.

More preferably regions of the outer layer are heat-sealed together to form the package. Heat-sealing may also involve sealing regions of the outer layer and the inner layer together and/or regions of the inner-layer together.

The package comprises a cavity delimited by a wall, wherein the wall comprises the film and the cavity contains a particulate, savoury material. Preferably the wall comprises the film oriented with at least part of the inner layer facing the cavity.

The particulate material could be any powder or granular savoury material. Preferably however, the particulate material is a savoury material such as dried soup, sauce, stock, gravy or bouillon.

Where a feature is disclosed with respect to a particular aspect of the invention (for example a packaged product of the invention), such disclosure is also to be considered to apply to any other aspect of the invention (for example a process of the invention) mutatis mutandis.

Although the invention has been described with reference to specific embodiments, various modifications of the described modes for carrying out the invention which are apparent to those skilled in the relevant fields are intended to be within the scope of the following claims.

For the avoidance of doubt, the word "comprising" is intended to mean "including" but not necessarily "consisting of" or "composed of". In other words, the listed steps or options need not be exhaustive.

The disclosure of the invention as found herein is to be considered to cover all embodiments as found in the claims as being multiply dependent upon each other irrespective of the fact that claims may be found without multiple dependency or redundancy

EXAMPLES

Example 1

A packaged product according to the invention was manufactured with the following structure:

A packaging product comprising a multi-layer film was manufactured with the following structure:

Outer layer—Heat-sealable OPP. Both sides are corona treated. Thickness of 20 micron or 21 micron with 1 micron PVOH coating. The oxygen transfer rate is determined by American Society for Testing and Materials (ASTM) method D 3985-17 (Standard Test Method for Oxygen Gas Transmission Rate Through Plastic Film and Sheeting Using a Coulometric Sensor).

Intermediate layer—BOPP metallized on the outer face. Chemically-corona treated on the metallized face and electrically-corona treated on the other face. Thickness of 20 micron. The intermediate layer preferably has an oxygen transfer rate of equal to or less than 80 $cm^3/m^2/24$ h (ASTM method D 3985-17).

Inner layer—OPP. Thickness of 40 microns

Lamination of the inner and intermediate layers was achieved through a thin layer of adhesive without solvent whereas lamination of the outer and the intermediate layers was achieved with adhesive with solvent. Excellent lamination was achieved.

The final multilayer film has an oxygen transmission of 0.1 $cm^3/m^2/24$ hr as measured according to F1927-14 (23° C., 85% RH).

The film was heat-sealed into a pouch and dosed with dry savoury material, either using a rotary forming filling sealing machine has speed of 85 ppm or a horizontal forming filling sealing machine has speed of 140 ppml The resulting packaged product showed excellent in-use properties and, in particular did not demonstrate any decomposition of the savoury material. The packaging has excellent processability on filling lines and is amenable to recycling.

Comparative Example A

The terpolymer film of U.S. Pat. No. 6,503,635 B1 cannot be processed on high speed packaging lines used above in Example 1. The terpolymer film is not suitable for use a savoury packaging film due to the poor processability and recyclability of such a film.

Comparative Example B

The film U.S. Pat. No. 6,410,124 B1 is not suitable for use a savoury packaging film. The film has a high oxygen transmission rate of 4.9 cm3/m2/24 hr, meaning that packaging consisting of this film has a poor storage stability.

The invention claimed is:

1. A packaged product comprising a cavity delimited by a wall, wherein the wall comprises a multi-layer packaging film comprising:
   an inner layer comprising an oriented polypropylene (OPP);
   an outer layer comprising an oriented polypropylene (OPP); and
   an intermediate layer comprising polypropylene and having an outer face facing the outer layer and an inner face facing the inner layer,
   wherein one of the inner and outer faces of the intermediate layer is metallized,
   wherein the non-metalized surface of the inner and outer faces of the intermediate layer is an electrical corona treated layer,
   wherein a particulate, savoury food composition is contained within the cavity, and wherein the savoury food material is a dried soup, sauce, stock, gravy or bouillon, and
   wherein the outer layer comprises an oxygen barrier agent selected from the group consisting of polyvinyl alcohol (PVOH), ethylene vinyl alcohol, and poly(vinylidene chloride).

2. The packaged product according to claim 1, wherein one of the inner and outer faces of the intermediate layer is a metallized, chemical corona treated layer.

3. Packaging product according to claim 1, wherein the multilayer packaging film has an oxygen transmission rate of less than 0.2 $cm^3/m^2/24$ hr as measured according to F1927-14 ASTM.

4. The packaged product according to claim 1, wherein the savoury food material is a mixture of dry, savoury food ingredients, wherein the savoury food ingredients are selected from the group consisting of fat, vegetable matter, meat matter, starch and salt.

5. The packaging product according to claim 4, wherein the wall comprises the film oriented with at least part of the inner layer facing the cavity.

6. The packaged product according to claim 4, wherein the savoury food ingredients are selected from the group consisting of fat, vegetable matter, meat matter, starch and salt.

7. A process for producing a packaged food product according to claim 1, comprising the step of:
   i) providing a multi-layer packaging film comprising:
      a. an inner layer comprising an oriented polypropylene (OPP);
      b. an outer layer comprising an oriented polypropylene (OPP); and
      c. an intermediate layer comprising polypropylene and having an outer face facing the outer layer and an inner face facing the inner layer,
   ii) forming the multi-layer packaging film into a packaging precursor and filling the packaging precursor with a particulate, savoury material, wherein the savoury food material is a dried soup, sauce, stock, gravy or bouillon,
   iii) sealing the packaging precursor to provide a packaged food product,
   wherein one of the inner and outer faces of the intermediate layer is metallized, wherein the non-metalized surface of the inner and outer faces of the intermediate layer is an electrical corona treated layer, and
   wherein the outer layer comprises an oxygen barrier agent selected from the group consisting of polyvinyl alcohol (PVOH), ethylene vinyl alcohol, and poly(vinylidene chloride).

8. The process according to claim 7 wherein the inner layer comprises a non-migratory slip agent selected from high molecular weight silicone, poly(methyl methacrylate) and mixtures thereof.

9. A process for producing a multi-layer packaging film for a packaged food product, wherein the process comprises the steps of:
   (i) providing a first packaging sheet material comprising an oriented polypropylene;
   (ii) providing a second packaging sheet material comprising an oriented polypropylene;
   (iii) providing a third packaging sheet material comprising polypropylene and having an inner and an outer face;
   (iv) laminating the first material on the inner face of the third material and the second material on the outer face of the third material,
   wherein one of the inner and outer faces of the intermediate layer is metallized, wherein the non-metalized surface of the inner and outer faces of the intermediate layer is an electrical corona treated layer, and
   wherein the outer layer comprises an oxygen barrier agent selected from the group consisting of polyvinyl alcohol (PVOH), ethylene vinyl alcohol, and poly(vinylidene chloride).

10. The process according to claim 9 wherein the first packaging sheet comprises a non-migratory slip agent selected from high molecular weight silicone, poly(methyl methacrylate) and mixtures thereof.

* * * * *